(12) United States Patent
Blanchard et al.

(10) Patent No.: US 6,219,791 B1
(45) Date of Patent: *Apr. 17, 2001

(54) METHOD AND APPARATUS FOR GENERATING AND VERIFYING ENCRYPTED DATA PACKETS

(75) Inventors: Scott David Blanchard, Mesa; Dean Paul Vanden Heuvel, Chandler, both of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,192

(22) Filed: Jun. 22, 1998

(51) Int. Cl.[7] .............................. G06F 11/30; G06F 7/02; H04L 9/00
(52) U.S. Cl. .......................... 713/201; 713/168; 714/821
(58) Field of Search .................. 713/181, 168, 713/161; 380/44, 45, 2; 714/819, 821, 824

(56) References Cited

U.S. PATENT DOCUMENTS

| | | | |
|---|---|---|---|
| 4,760,599 | * | 7/1988 | Okamoto et al. ................. 713/161 |
| 5,016,276 | * | 5/1991 | Matumoto et al. ................. 380/45 |
| 5,365,591 | * | 11/1994 | Carsell et al. ..................... 713/164 |
| 5,432,848 | * | 7/1995 | Butter et al. ........................ 380/2 |
| 5,608,798 | * | 3/1997 | Likens et al. ....................... 380/2 |
| 5,631,960 | * | 5/1997 | Likens et al. ....................... 380/2 |
| 5,991,401 | * | 11/1999 | Daniels et al. .................... 713/168 |
| 6,009,174 | * | 12/1999 | Tatebayashi et al. .............. 380/277 |

OTHER PUBLICATIONS

Menezes et al. Handbook of Applied Cryptography. Oct. 1996. pp. 359–368.*

* cited by examiner

*Primary Examiner*—Gail Hayes
*Assistant Examiner*—Bryan Latham
(74) *Attorney, Agent, or Firm*—Dana B. LeMoine; James E. Klekotka; Maurice J. Jones

(57) ABSTRACT

A system for encrypting and verifying a data packet includes an encryptor (20), a decryptor (30), an error detector (40), and switch (65). A data packet with embedded error detection codes is encrypted by the encryptor (20), decrypted by the decryptor (30), and then the error detector (40) examines the embedded error detection codes to determine if the data packet has had errors introduced during the encryption/decryption process. When errors are detected, the switch (65) is opened to keep erroneous data from being transmitted.

5 Claims, 2 Drawing Sheets

METHOD AND APPARATUS FOR GENERATING AND VERIFYING ENCRYPTED DATA PACKETS

FIELD OF THE INVENTION

This invention relates in general to the generation and verification of encrypted data packets and, in particular, to the verification of encrypted data packets without redundant hardware or software.

BACKGROUND OF THE INVENTION

Many communications systems benefit from secure communications provided by encrypted digital data packets. In prior art secure communications systems redundant encryption circuits have been employed to ensure that unencrypted data is not inadvertently transmitted. Encrypted data packets from the redundant encryption circuits are compared, and if they do not match, then an error has been detected, and transmission can be stopped.

This prior art scheme requires that redundant hardware or software be employed. When redundant hardware or software is employed for verification, errors are only found when the redundant functions do not behave identically. If a design flaw exists in either the redundant hardware or software, then identical errors will be produced in the redundant circuits and the error will go undetected.

Other prior art systems decrypt the encrypted data packets and compare the resulting decrypted data packets with the original unencrypted data packets. In secure communications systems, it is undesirable to maintain unencrypted data packets because this increases the possibility of a breach in security. This prior art scheme involving decrypting and comparing to the original data packet is undesirable because the original, unencrypted data packet must be maintained for purposes of comparison.

What is needed is a method and apparatus for encrypting data packets, and for verifying the proper encryption of data packets, without using redundant hardware or software. Also what is needed is a method and apparatus for encrypting and verifying the resulting encrypted data packets without maintaining an unencrypted version of the data packets.

DETAILED DESCRIPTION OF THE DRAWINGS

Figure 1:
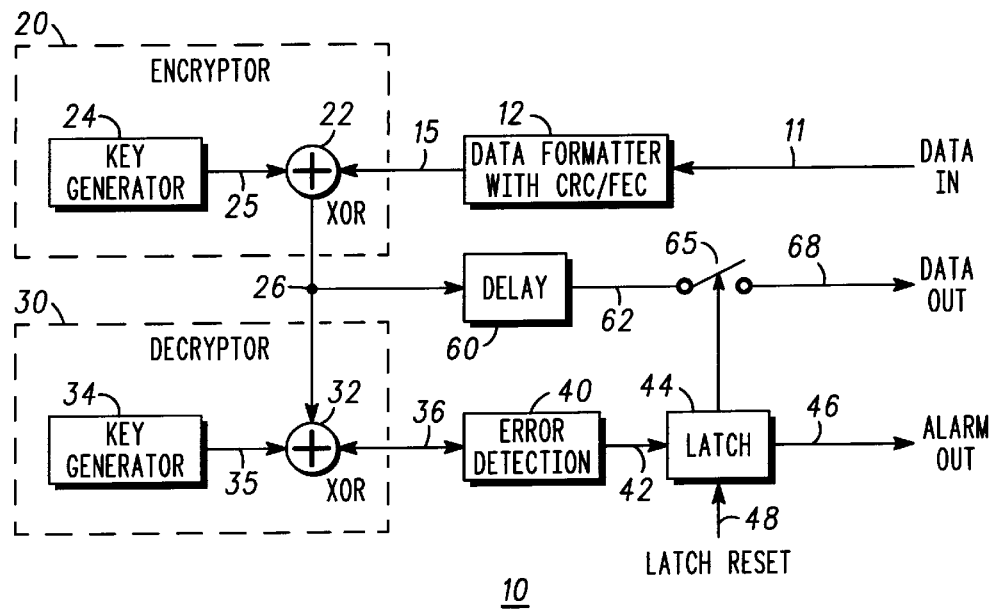
FIG. 1 shows a data encryption and verification system in accordance with a preferred embodiment of the present invention.

Turning now to the drawings in which like reference characters indicate corresponding elements throughout the several views, attention is first directed to FIG. 1. FIG. 1 shows a data encryption and verification system in accordance with a preferred embodiment of the present invention. System 10 as shown in FIG. 1 includes data formatter 12, encryptor 20, decryptor 30, error detector 40, latch 44, delay 60, and switch 65. Data enters system 10 on data signal 11. Data signal 11 provides data to data formatter 12. In a preferred embodiment, data formatter 12 accepts a single serial signal on data signal 11; however, one skilled in the art will appreciate that data signal 11 can be any number of physical signals while still practicing the present invention.

Data formatter 12 can perform any one or a number of different functions. These functions include, but are not limited to, applying error detection codes, error correction codes, and performing compression. Typical error detection codes such as cyclical redundancy check (CRC) are well known in the art, and need not be explained further here. In a preferred embodiment of the present invention, where data signal 11 represents a continuous stream of data, such as voice data, data formatter 12 additionally blocks the data prior to applying error detection and correction codes. An exemplary application of system 10 where data formatter 12 performs blocking would be the Global System for Mobile Communications (GSM). In an alternate embodiment, where data signal 11 represents a packetized stream of data, data formatter 12 typically does not additionally block the data unless data packets of a different size are needed for transmission.

Data formatter 12 sends data to encryptor 20 on signal 15. The data on signal 15 is referred to as "plain text" because it has yet to be encrypted. The plain text on signal 15 is made up of packets which include error detection data embedded within. Additionally, the plain text packets can include embedded error correction data. In an alternate embodiment, system 10 operates on data which is already packetized into packets which include error detection and correction data. In this embodiment, data formatter 12 can be omitted, and data input to system 10 as plain text on signal 15.

Encryptor 20 includes key generator 24 and exclusive-or (XOR) 22. XOR 22 receives plain text on signal 15, and receives key 25 from key generator 24. XOR 22 applies key 25 to the plain text to generate encrypted data packets on signal 26. XOR 22 is shown in FIG. 1 as an exemplary circuit for applying key 25 to plain text on signal 15. One skilled in the art will appreciate that other functions can exist in place of XOR 22 while still practicing the present invention.

Encrypted data packets leave encryptor 20 on signal 26 and travel to delay 60 and decryptor 30. Encrypted data is also referred to as "cipher text." It is important to note that plain text does not travel between encryptor 20 and decryptor 30. This is advantageous in part because it is desirable not to have cipher text and plain text on the same interface. Security is more easily breached in systems that have cipher text and plain text on the same interface because if an intruder gains access to that interface, the key can be deciphered. System 10 as exemplified in FIG. 1 does not suffer from this drawback because only cipher text is on the interface between encryptor 20 and decryptor 30.

Decryptor 30 includes XOR 32 and key generator 34. Decryptor 30 operates in a manner analogous to encryptor 20. Key generator 34 generates key 35 which allows XOR 32 to decrypt the encrypted data packets on signal 26. The result is decrypted data packets on signal 36. The decrypted data packets on signal 36 are received by error detector 40. Error detector 40 detects if errors exist in the decrypted data packets by examining the error detection codes embedded within the packets. In a preferred embodiment, the packets will also include error correction data, but this is not a limitation of the present invention. If error detector 40 detects an error in a decrypted data packet, then system 10 has detected an error that has occurred in the signal path between the plain text on signal 15 and the plain text on signal 36. When errors are detected, error detector 40 outputs error signal 42 which is received by latch 44.

Latch 44 outputs an alarm on alarm signal 46. Alarm signal 46 can be used to alert a user, or can be used to alert an automated system capable of dealing with the existing error condition. Latch 44 also controls switch 65. In normal operation, when no errors are present, switch 65 is closed thereby allowing the encrypted data packets on signal 26 to appear on the system output signal 68. When latch 44 has latched an error signal, switch 65 is opened and the encrypted data packets on signal 26 are prevented from leaving system 10. Delay 60 is coupled between signal 26 and switch 65 to compensate for any delay present in error detector 40 and latch 44. Latch 44 also receives a reset signal. The reset signal is used to reset latch 44 when it is desirable to close switch 65.

The present invention as exemplified by system 10 in FIG. 1 has many advantages. One such advantage is that system 10 is capable of verifying the proper encryption of data packets without plain text and cipher text appearing on the same interface. This improves the security of this secure communications system. The error detection codes embedded in the data packets is advantageously used by system 10 to verify the proper encryption of data packets. This allows system 10 to detect an error and stop transmission without knowledge of the correct plain text.

Figure 2:
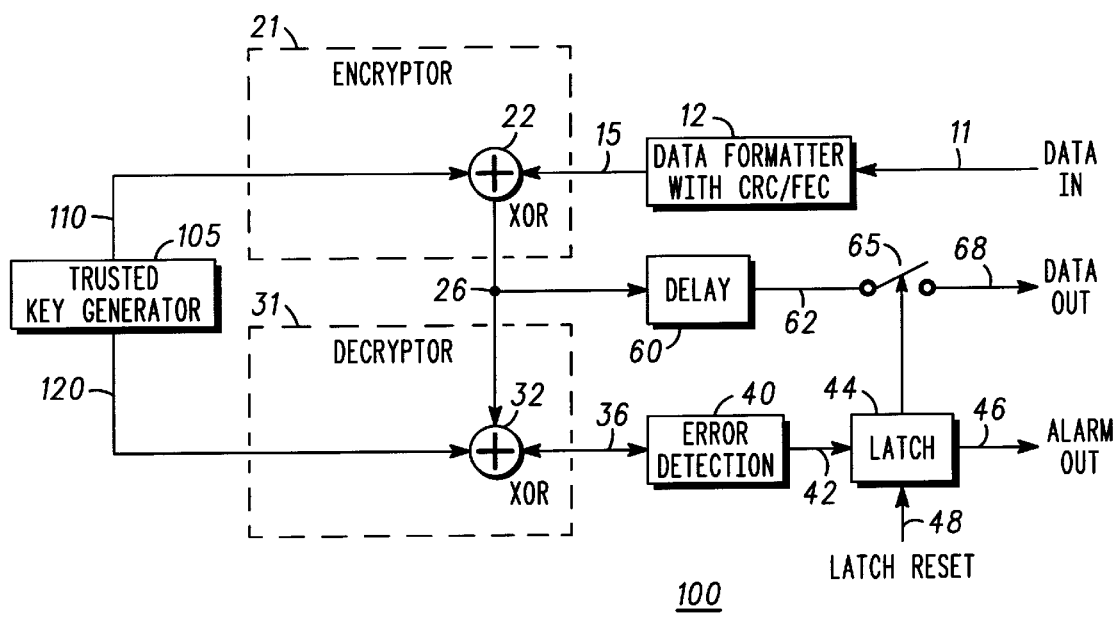
FIG. 2 shows a data encryption and verification system in accordance with an alternate embodiment of the present invention.

FIG. 2 shows a data encryption and verification system in accordance with an alternate embodiment of the present invention. Much of the alternate embodiment exemplified by system 100 is common to the preferred embodiment exemplified by system 10 (FIG. 1). Differences exist between encryptor 21 and encryptor 20 (FIG. 1), and between decryptor 31 and decryptor 30 (FIG. 1). Encryptor 21 includes XOR 22 but does not have a dedicated key generator. Likewise, decryptor 31 includes XOR 32 but also lacks a dedicated key generator. In the alternate embodiment of FIG. 2, trusted key generator 105 provides key 110 to encryptor 21, and provides key 120 to decryptor 31. The use of a trusted key generator is advantageous in part because trusted key generators are commercially available and have undergone independent certification.

Figure 3:
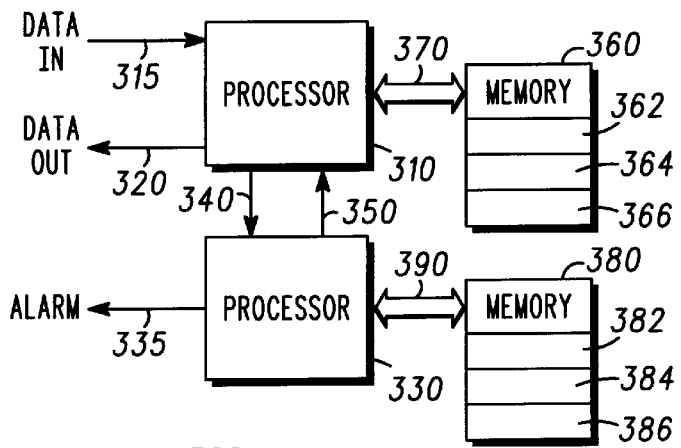
FIG. 3 shows a data encryption and verification system in accordance with an alternate embodiment of the present invention.

FIG. 3 shows a data encryption and verification system in accordance with an alternate embodiment of the present invention. System 300 includes a processor 310, memory 360, processor 330, and memory 380. System 300 provides functionality in common with system 10 (FIG. 1), and system 100 (FIG. 2), but utilizes digital processors and memory rather than dedicated functional blocks. Processor 310 receives data on signal 315. When the data on signal 315 represents a continuous data stream, such as voice data, processor 310 blocks the data and applies error detection codes in much the same manner as data formatter 12 (FIG. 1). On the other hand, when the data on signal 315 is already packetized, processor 310 need not perform packetization, and when the data on signal 315 already includes error detection codes, processor 310 need not generate the error detection codes.

Processor 310 communicates with memory 360 using bus 370. Bus 370 is preferably a standard processor interface, such as one including multiple address lines, data lines, and control lines; however, any bus which facilitates communication between processor 310 and memory 360 can be used while still practicing the present invention. Memory 360 has multiple portions including portion 362, portion 364, and portion 366. For exemplary purposes, memory 360 has been divided into three portions in FIG. 3, but one skilled in the art will appreciate that memory 360 can be divided into any number of portions. A first portion of memory 360, portion 362, includes commands for processor 310 to format data packets and apply error detection codes thereto. A second portion of memory 360, portion 364, includes commands for processor 310 to encrypt the data packets. Processor 310 sends the resulting encrypted data packets on signal 340 to processor 330. Signal 340 is analogous to signal 26 (FIG. 2), in that it provides a communication channel for encrypted data packets without transmitting plain text. Processor 310 also generates encrypted packets on signal 320 for transmission outside of system 300. Signal 320 is analogous to signal 68 (FIG. 2), in that when no errors are present, signal 320 transmits encrypted and verified data packets outside of system 300.

Processor 330 receives cipher text on signal 340 and performs a decryption function analogous to that of decryptor 30 (FIG. 1). Processor 330 also performs error detection on the resulting decrypted data packets and reports errors back to processor 310 on signal 350. Processor 310 preferably receives signal 350 on a high priority interrupt line so that when an error is reported by processor 330, system 300 reacts quickly. Signal 350 is analogous to the latched error signal of FIG. 1 used to control switch 65. When processor 310 receives an error indication on signal 350, transmission of encrypted data packets on signal 320 is stopped. Processor 330 communicates with memory 380 using bus 390. Bus 390, like bus 370, is preferably a standard digital processor bus. Memory 380, like memory 360, is divided into multiple portions. Memory 380 includes portion 382, portion 384, and portion 386. A first portion of memory 380, portion 382, includes commands for processor 330 to perform decryption of the encrypted data packets received on signal 340. A second portion of memory 380, portion 384, includes commands for processor 330 to perform error detection and to generate signal 350. When processor 330 detects an error in a packet received on signal 340, alarm signal 335 is asserted.

System 300 as shown in FIG. 3 includes two separate processors and two separate memories. Variations in the number of processors and memories are contemplated in additional alternate embodiments. For example, in one alternate embodiment a single processor and a single memory are employed. In this embodiment, processor 310 performs both encryption and decryption using commands from memory 360. When a single processor is used, separate processing threads are preferably used for each of the encryption, decryption, and error detection functions.

Figure 4:
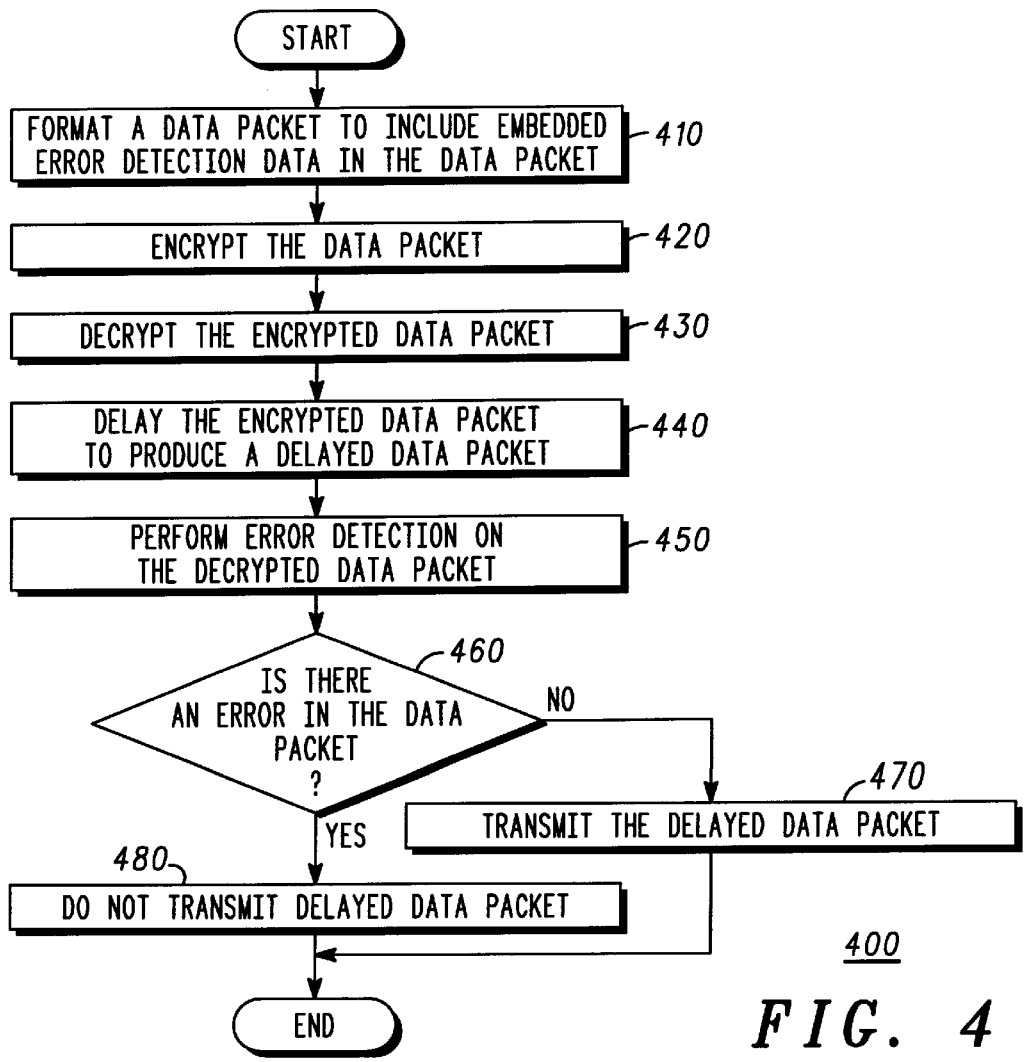
FIG. 4 shows a flowchart for a method of encrypting and verifying a data packet in accordance with a preferred embodiment of the present invention.

FIG. 4 shows a flowchart of a method of generating and verifying an encrypted data packet in accordance with a preferred embodiment of the present invention. The specific order given for the steps in method 400 is exemplary, and the order of steps may be interchanged while still practicing the present invention. In step 410, a data packet is formatted to include error detection codes. When data packets already having embedded error detection codes are used, step 410 can be omitted. In step 420, the data packet which includes embedded error detection codes is encrypted. The result of step 420 is an encrypted data packet. Then, in step 430, the encrypted data packet is decrypted. The result of step 430 is a decrypted data packet. In step 440, the encrypted data packet is delayed to produce a delayed data packet. In step 450, error detection is performed on the decrypted data packet using the embedded error detection codes to ascertain if any errors were made during encryption or decryption. In step 460, a decision is made if there is an error in a data packet. If, in step 460, an error is found, processing proceeds with step 480 where the delayed data packet is not transmitted. If, on the other hand, an error is not found, processing proceeds to step 470 were the delayed data packet is transmitted.

In summary, the method and apparatus of the present invention provides an advantageous means for generating and verifying encrypted data packets. By providing separate mechanisms for encrypting and verifying, redundant design flaws are kept from allowing incorrect data from being transmitted. In addition, by utilizing embedded error detection codes to determine if errors have been introduced, the method and apparatus of the present invention does not route plain text and cipher text to the same interface, thereby increasing security.

While we have shown and described specific embodiments of the present invention, further modifications and improvements will occur to those skilled in the art. For example, the specific embodiments have been described in the context of systems for transmitting voice data and other packet data having embedded error detection codes. One skilled in the art will appreciate that the method and apparatus of the present invention is applicable to any type of secure transmission system, and is not intended to be limited to voice or any other type of data. We desire it to be understood, therefore, that this invention is not limited to the particular forms shown and we intend in the appended claims to cover all modifications that do not depart from the spirit and scope of this invention.

What is claimed is:

1. An apparatus for generating and verifying encrypted text, said apparatus comprising:

an input and an output;

a data formatter coupled to said input for creating data packets, said data formatter formatting data into blocks and applying error detection codes;

a data encryptor having a plain text input for receiving said data packets which include embedded error detection codes, said plain text input being coupled to said data formatter, and having an encrypted text output, said data encryptor further comprising a first key generator and means for creating encrypted data packets by encrypting said data packets using a key from said first key generator;

a delay circuit having an encrypted text input coupled to the encrypted text output of the data encryptor, and having a delayed encrypted text output, said delay circuit compensating for delays in said apparatus;

a data decryptor having an encrypted text input coupled to the encrypted text output of the data encryptor, and having a decrypted text output, said data decryptor further comprising a second key generator and means for creating decrypted data packets by decrypting the encrypted data packets using a key from said second key generator, said key from said second key generator being substantially equal to said key from said first key generator;

an error detector having an input coupled to the decrypted text output of the data decryptor, and having an error output, wherein the error detector is configured to examine the embedded error detection codes in the decrypted data packets to determine if errors exist;

a latch having an input coupled to said error detector, having a reset input, and an output, said latch latching when an error signal is received from said error detector; and a switch coupled between the delayed encrypted text output of the delay circuit and the output of the apparatus, and coupled to the output of the latch such that when the latch latches due to an error, the switch opens, preventing encrypted text from leaving the apparatus.

2. The apparatus of claim 1 further comprising:

a trusted key generator comprising said first key generator, and said second key generator.

3. A method of generating and verifying an encrypted data packet, said method comprising the steps of:

creating plain text by formatting a data packet to include embedded error detection codes;

creating cipher text by encrypting said plain text, wherein an encrypted data packet which includes said embedded error detection codes is produced by encrypting said data packet using a trusted key;

producing a delayed data packet by delaying said encrypted data packet;

creating a decrypted data packet which includes said embedded error detection codes by decrypting the encrypted data packet using said trusted key;

performing error detection on the decrypted data packet, wherein said embedded error detection codes are used to determine when an error is present; and when, as a result of said error detection performing step, no error is found, transmitting the delayed data packet, otherwise, not transmitting the delayed data packet, wherein said apparatus does not route said plain text and said cipher text to the same output, thereby increasing security.

4. The method of claim 3 wherein the data packet is a voice data packet.

5. The method of claim 3 wherein the data packet is not a voice data packet.

\* \* \* \* \*